(12) United States Patent
Senba

(10) Patent No.: US 8,190,187 B2
(45) Date of Patent: May 29, 2012

(54) COMMUNICATION APPARATUS, BASE STATION APPARATUS AND COMMUNICATION METHOD

(75) Inventor: Teruhiko Senba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 423 days.

(21) Appl. No.: 12/546,861

(22) Filed: Aug. 25, 2009

(65) Prior Publication Data

US 2010/0069111 A1    Mar. 18, 2010

(30) Foreign Application Priority Data

Sep. 18, 2008    (JP) .................................. 2008-238813

(51) Int. Cl.
*H04B 7/00*    (2006.01)

(52) U.S. Cl. .... 455/522; 455/69; 455/67.13; 455/115.1; 370/329; 370/332

(58) Field of Classification Search .................... 455/69, 455/522, 424, 456.5, 425, 456.6, 507, 509, 455/436, 450, 452.2, 72, 63.1, 67.13, 67.11, 455/115.1; 370/208, 311, 328, 329, 336, 370/342, 338, 280, 335, 332; 375/260, 267
See application file for complete search history.

(56) References Cited

U.S. PATENT DOCUMENTS

| | | | |
|---|---|---|---|
| 5,491,481 A * | 2/1996 | Akagiri | 341/87 |
| 6,799,044 B1 * | 9/2004 | Wesby et al. | 455/452.1 |
| 2001/0008523 A1 * | 7/2001 | Song | 370/335 |
| 2008/0130599 A1 * | 6/2008 | Horikoshi et al. | 370/338 |
| 2008/0143512 A1 * | 6/2008 | Wakisaka et al. | 340/504 |
| 2008/0153429 A1 * | 6/2008 | Johnson et al. | 455/72 |
| 2008/0227479 A1 * | 9/2008 | Iwata | 455/522 |
| 2010/0029321 A1 * | 2/2010 | Miyamoto | 455/522 |
| 2010/0054161 A1 * | 3/2010 | Montojo et al. | 370/280 |
| 2011/0261774 A1 * | 10/2011 | Lunttila et al. | 370/329 |

FOREIGN PATENT DOCUMENTS

| | | |
|---|---|---|
| JP | 07-123460 | 5/1995 |
| JP | 09-084130 | 3/1997 |

OTHER PUBLICATIONS

Nokia Siemens Networks, Nokia; "Multiplexing of ACK/NACK and CQI from the same UE"; Agenda Item: 7.13.2; Document: Discussion and Decision; 3GPP TSG RAN WG1 Meeting #49, R1-072311; Kobe, Japan, dated May 7-11, 2007.

* cited by examiner

*Primary Examiner* — Tan Trinh
(74) *Attorney, Agent, or Firm* — Myers Wolin, LLC

(57) ABSTRACT

A communication apparatus includes a judgment section which judges the state of receiving a downlink control channel from a base station, and a power control section which does not assign transmission power to at least the top one time block in a frame transmitted to be by an uplink control channel, if it is judged by the judgment section that the downlink control channel has not been received.

5 Claims, 7 Drawing Sheets

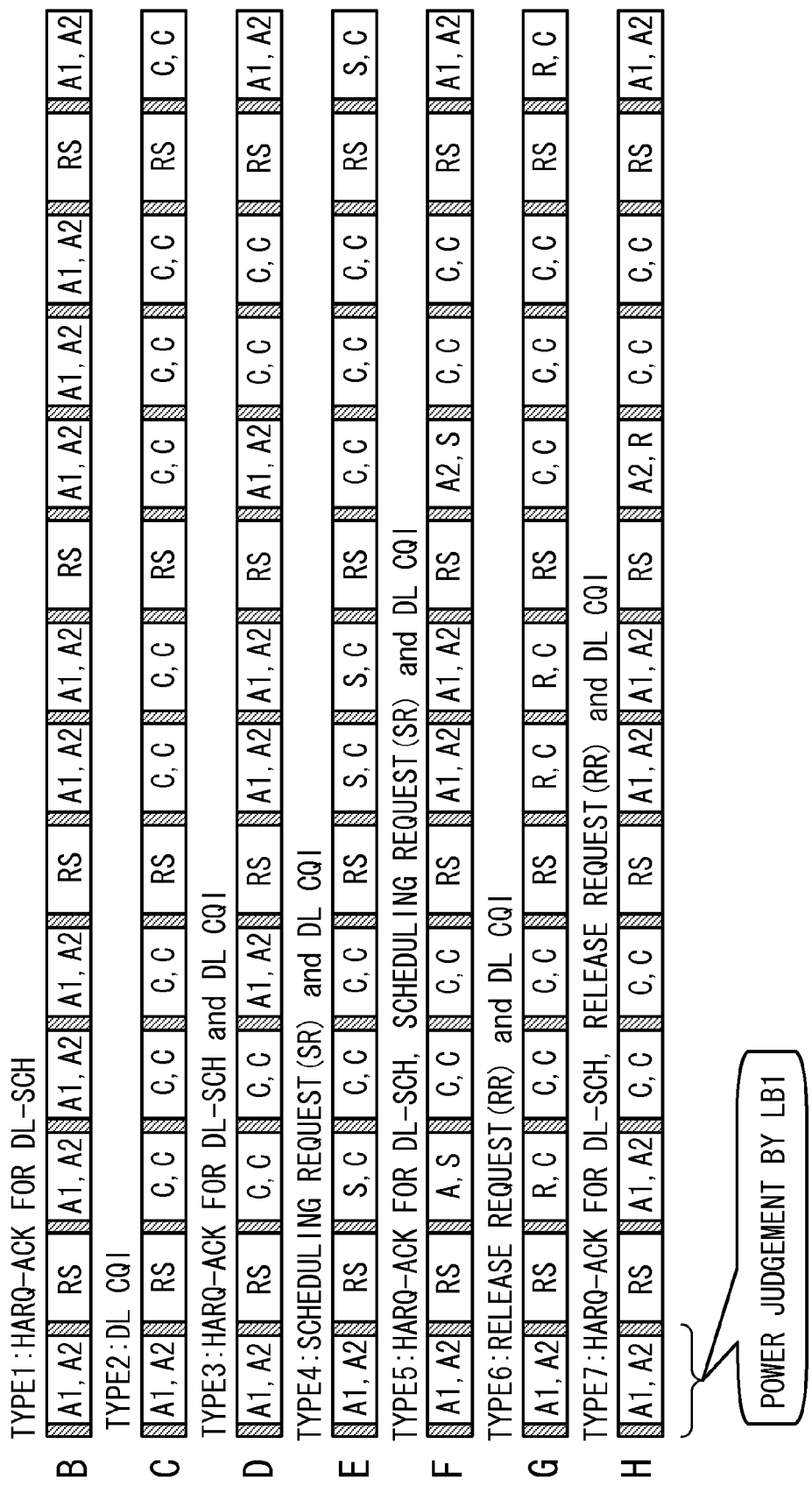

COMMUNICATION APPARATUS, BASE STATION APPARATUS AND COMMUNICATION METHOD

CROSS-REFERENCE TO RELATED APPLICATIONS

This application is based upon and claims the benefit of priority of the prior Japanese Patent Application No. 2008-238813, filed on Sep. 18, 2008, the entire contents of which are incorporated herein by reference.

FIELD

The present invention relates to a transmission technique for an uplink control channel from a communication apparatus to a base station apparatus.

BACKGROUND

LTE (Long Term Evolution) is a high-speed data communication method for which standardization is promoted by 3GPP (3rd Generation Partnership Project). In a mobile communication system which adopts LTE, an evolved Node B (hereinafter written as an eNB) which is a base station and a mobile station (User Equipment; hereinafter written as a UE) performs wireless communication with each other.

In LTE, a PDSCH (Physical Downlink Shared Channel), a PDCCH (Physical Downlink Control Channel), a PBCH (Physical Broadcast Channel) and the like are defined as downlink physical channels between the eNB and the UE, and a PUSCH (Physical Uplink Shared Channel), a PUCCH (Physical Uplink Control Channel), a PRACH (Physical Random Access Channel) and the like are defined as uplink physical channels. Among these, an uplink data signal is transferred by the PUSCH, and an uplink control signal including scheduling information (a scheduling request, a release request and the like), a CQI (Channel Quality Indicator), ACK (Acknowledgement) or NACK (Negative Acknowledgment), and the like is transferred by the PUCCH.

In such an LTE system, if eNB transmitted control data to the UE using a control channel such as the PDCCH, the eNB waits for ACK information or NACK information indicating confirmation of receiving the control data. This ACK information or NACK information is transmitted from the UE to the eNB by the PUCCH.

For example, there is known a technique in which the UE causes a reference signal in the PUCCH to have two sequences for showing ACK information and NACK information and performs transmission (see Technical Specification Group Radio Access Network, "Multiplexing of ACK/NACK and the CQI from the same UE", 3rd Generation Partnership Project, 3GPP TSG RAN WG1 Meeting #49 R1-072311 Kobe Japan, May 7-11, 2007).

However, in the conventional technique described above, if the radio wave environment between the UE and the eNB is bad, and control data transmitted from the eNB cannot be normally received by the UE, it may occur that uplink control data transmitted from the UE to the eNB cannot be correctly acquired by the eNB.

Such a problem occurs for the following reason. When the radio wave environment is bad, and the UE cannot normally receive a control channel, the UE may not be able to judge whether or not control data transmitted from the eNB is included in the control channel and may not be able to return ACK information or NACK information to the eNB. On the other hand, having transmitted the control data, the eNB is waiting to receive ACK information or NACK information. If control state difference occurs between the eNB and the UE as described above, the eNB wrongly recognizes the format of a frame transmitted from the UE by the PUCCH and cannot grasp the arrangement and the like of the control data (CQI, scheduling information and the like) in the frame. Therefore, the eNB may not be able to obtain the control data.

In the conventional technique, the eNB identifies ACK information or NACK information using the reference signal, but it may not be able to grasp the state of receiving control data. In the case of increasing the number of sequences of the reference signal to notify the state of receiving control data (a DTX state and the like), the accuracy of channel presumption using this reference signal is reduced.

SUMMARY

According to an aspect of the invention, a communication apparatus includes a judgment section which judges the state of receiving a downlink control channel from a base station, and a power control section which does not assign transmission power to at least the top one time block in a frame to be transmitted by an uplink control channel if it is judged by the judgment section that the downlink control channel has not been received.

According to an aspect of the invention, a base station apparatus includes a receiving section which receives a frame transmitted by an uplink control channel from a communication apparatus, a power judgment section which compares the received transmission power of at least one time block in the frame received by the receiving section and a certain threshold, and judges the state of receiving a downlink control channel from the base station apparatus at the communication apparatus, based on a result of the comparison, and a determination section which determines the format of the frame received by the receiving section from among multiple uplink control channel frame formats, based on a result of the judgment by the power judgment section.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a PUCCH transmission type in a variation embodiment.

DESCRIPTION OF EMBODIMENTS

A mobile communication system as an embodiment will be described by giving concrete examples. In the concrete examples below, an example of a mobile communication system realized as an LTE system will be given. However, the configuration of each embodiment is not limiting the invention.

First Embodiment

A mobile communication system in a first embodiment will be described below.

System Configuration

Figure 1:
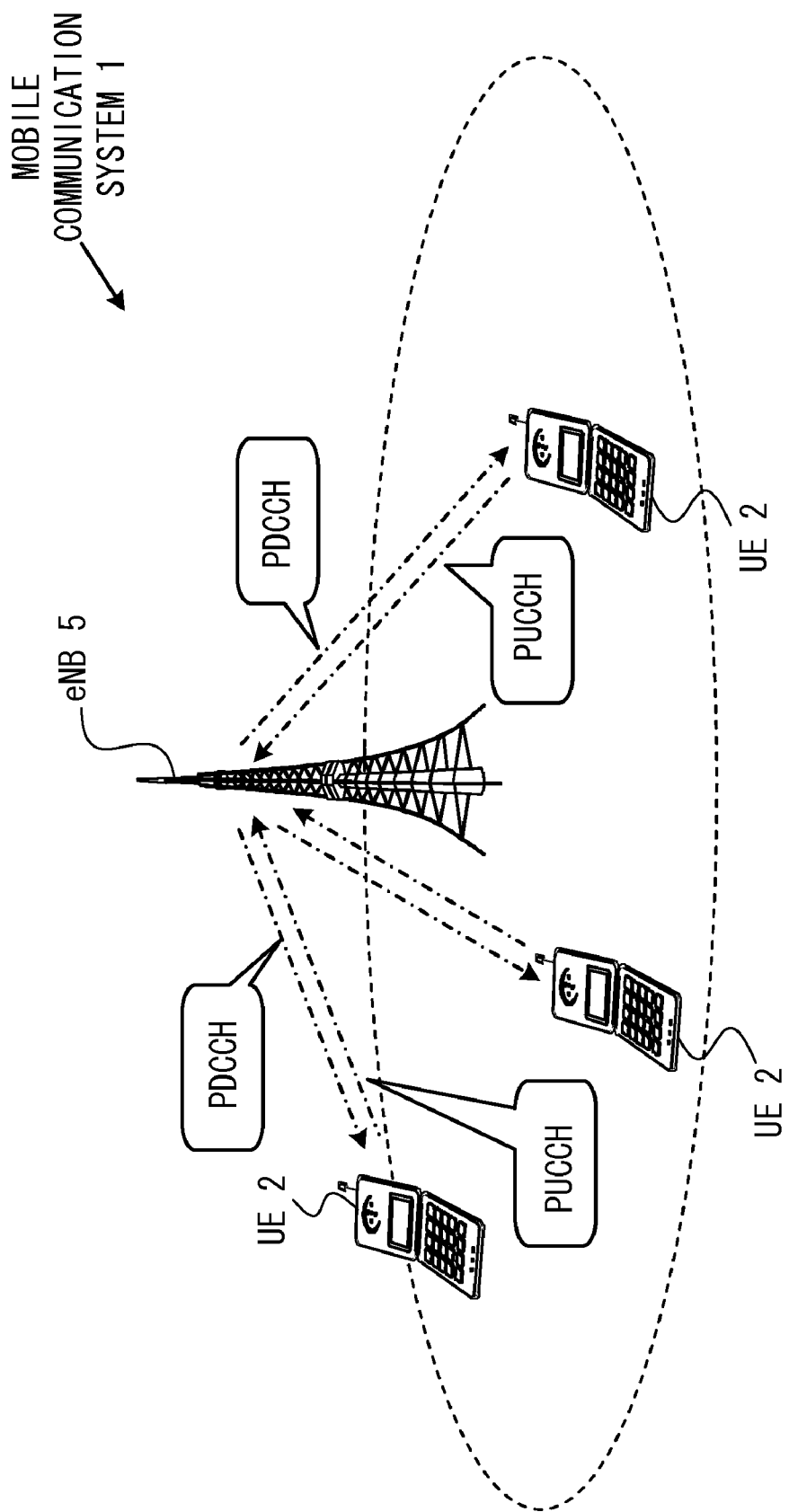
FIG. 1 is a diagram illustrating a system configuration example of a mobile communication system in a first embodiment.

FIG. 1 is a diagram illustrating a system configuration example of a mobile communication system in the first embodiment. The mobile communication system 1 in the first embodiment has an eNB 5 and a UE 2 such as a mobile phone. The UE 2 establishes a wireless link with the nearest eNB 5 and is provided with communication services such as a telephone communication service from the mobile communication system 1.

Communication Method

Between the eNB 5 and the UE 2, each of uplink and downlink control data is transferred by multiple channels such as a PDCCH and a PUCCH. In the description below, processings related to an uplink control channel from the UE 2 to the eNB 5 will be considered, and a description about the other control channels and data channels will be omitted. The mobile communication system 1 in the first embodiment does not restrict these other control channels and data channels.

Figure 2:
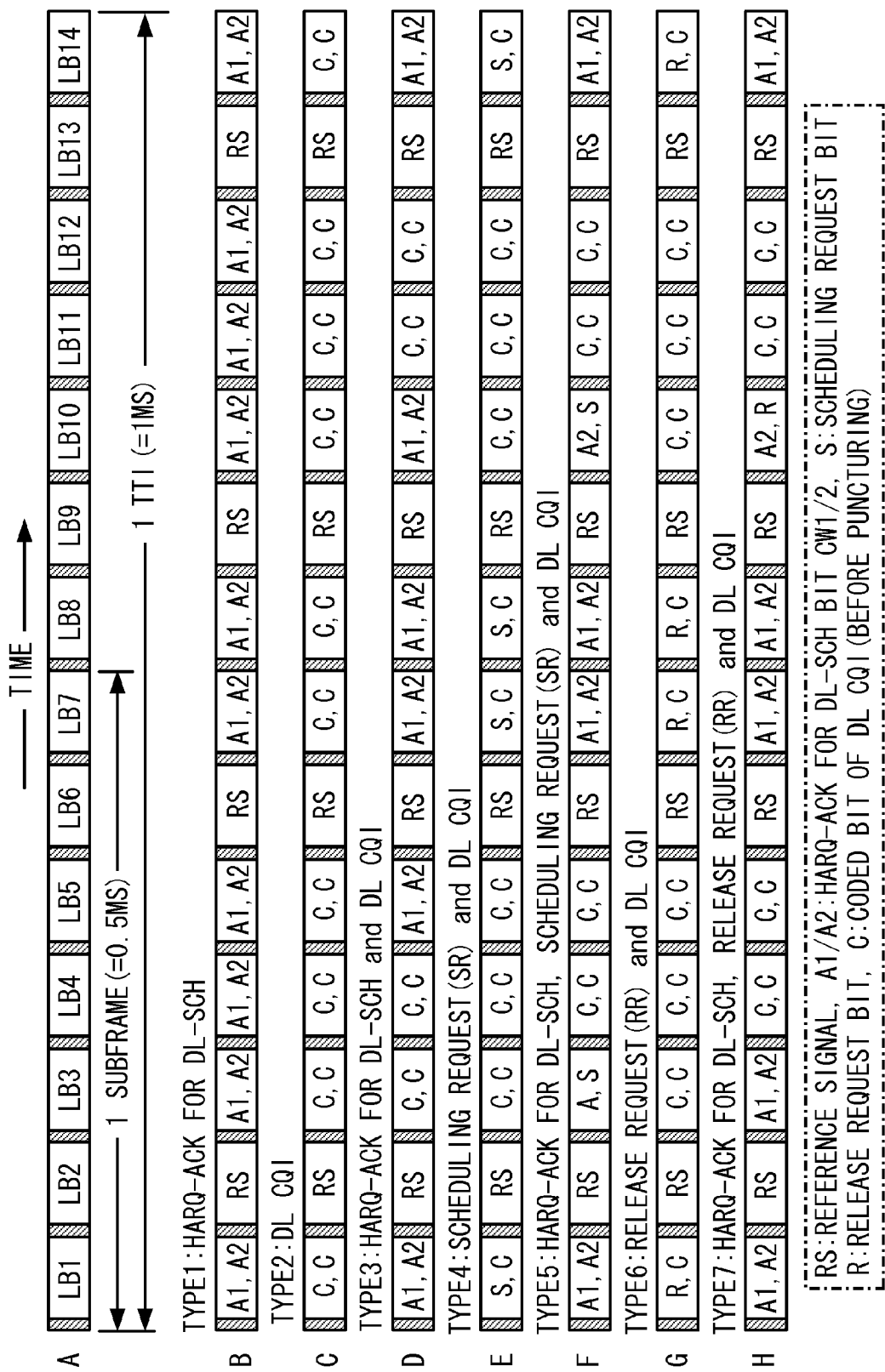
FIG. 2 is a diagram illustrating an example of a frame structure and a PUCCH transmission type in the first embodiment.

FIG. 2 is a diagram illustrating an example of a frame structure and a PUCCH transmission type in the first embodiment. A wireless frame transmitted between the eNB 5 and the UE 2 has a structure as illustrated in a frame A in FIG. 2. In the example of FIG. 2, a structure in the case of using short CP's (Cyclic Prefix) having a short CP length is illustrated. In the wireless frame A in this example, two subframes are included in a TTI (Transmission Time Interval) (for example, 1 ms), and, in each subframe, seven blocks (long blocks; LB1 to LB7 and LB8 to LB14 illustrated in FIG. 2) are arranged in a manner that each of the blocks is between short CP's.

In FIG. 2, an example using short CP's is illustrated. However, the invention is not limited to short CP's, as other CP's (for example, long CP's with a long length) are also applicable.

For example, a reference signal such as a pilot signal is arranged from among the long blocks LB2, LB6, LB9 and LB13. In each of the other long blocks, control data or user data as an OFDM (Orthogonal Frequency Division Multiplexing) symbol is arranged. Hereinafter, the long blocks in which a reference signal is arranged will be referred to as reference signal blocks, and the other long blocks will be referred to as data blocks.

In a wireless frame transferred by a PUCCH, the arrangement of control data in data blocks is determined according to the format type, as illustrated in frames B to H in FIG. 2. The control data transferred by a PUCCH includes a scheduling request (hereinafter, referred to as an SR) (S in FIG. 2), a release request (hereinafter referred to as an RR) (R in FIG. 2), a CQI (C in FIG. 2), ACK or NACK (hereinafter, referred to as ACK information as the case may be) (A, A1 and A2 in FIG. 2), and the like.

With respect to various format types, format type 1 includes only ACK information (TYPE 1 for the frame B in FIG. 2), format type 2 includes only a CQI (the frame C in FIG. 2), format type 3 includes ACK information and a CQI (the frame D in FIG. 2), format type 4 includes an SR and a CQI (the frame E in FIG. 2), format type 5 includes an SR, a CQI and ACK information (the frame F in FIG. 2), format type 6 includes an RR and a CQI (the frame G in FIG. 2), and format type 7 includes an RR, a CQI and ACK information (the frame H in FIG. 2). That is, the format types can be roughly classified into a group of the format types 1, 3, 5 and 7 which include ACK information in any data block and a group of the format types 2, 4 and 6 which do not include ACK information.

If the eNB 5 does not correctly recognize the format type, it cannot correctly acquire an SR, an RR, a CQI and ACK information from a control signal transferred from the UE 2 by a PUCCH. However, transmission timing is specified for the SR, the RR and the CQI. That is, if the eNB 5 can correctly recognize whether the group of the format types is 1, 3, 5 and 7, which include ACK information (hereinafter referred to as a format group 1), or the group of the format types is 2, 4 and 6, which do not include ACK information (hereinafter referred to as a format group 2), then the eNB 5 can select a format type from within the group.

If the UE 2 can normally receive control data from the eNB 5 by a downlink, then the UE 2 transmits ACK information by a PUCCH. That is, if the UE 2 is receiving control data from the eNB 5, then the UE 2 transmits control data which includes ACK information by a frame of the format type 1, 3, 5 or 7 in the format group 1 by a PUCCH. On the contrary, if the UE 2 cannot normally receive control data from the eNB 5 due to deterioration of the radio wave environment or the like, then it cannot judge whether or not the control data was included in the PDCCH, and therefore, it selects any one of the format types in the format group 2 as the format for a wireless frame in the PUCCH.

After transmitting the control data by a downlink, the eNB 5 transitions to a mode of waiting for ACK information to the control data. In this case, the eNB 5 attempts to acquire control data from a wireless frame in a PUCCH using any one of the format types in the format group 1. As described above, in the conventional technique, if the radio wave environment between the UE 2 and the eNB 5 is bad, and the control data transmitted from the eNB 5 cannot be normally received by the UE 2, then the format type of the wireless frame which is transmitted from the UE 2 and the format type recognized by the eNB 5 differ from each other. In such a case, the eNB 5 cannot correctly acquire an SR, an RR and a CQI included in the uplink control data which is transmitted from the UE 2.

In the mobile communication system 1 in the first embodiment, the eNB 5 can correctly acquire control data such as the SR, the RR and the CQI even during the occurrence of the differing format types as described above.

Apparatus Configuration

The apparatus configuration of each of the eNB 5 and the UE 2 which constitute the mobile communication system 1 in the first embodiment is described below. Here, items related to an uplink control channel (PUCCH) from the UE 2 to the eNB 5 are described.

UE

Figure 3:
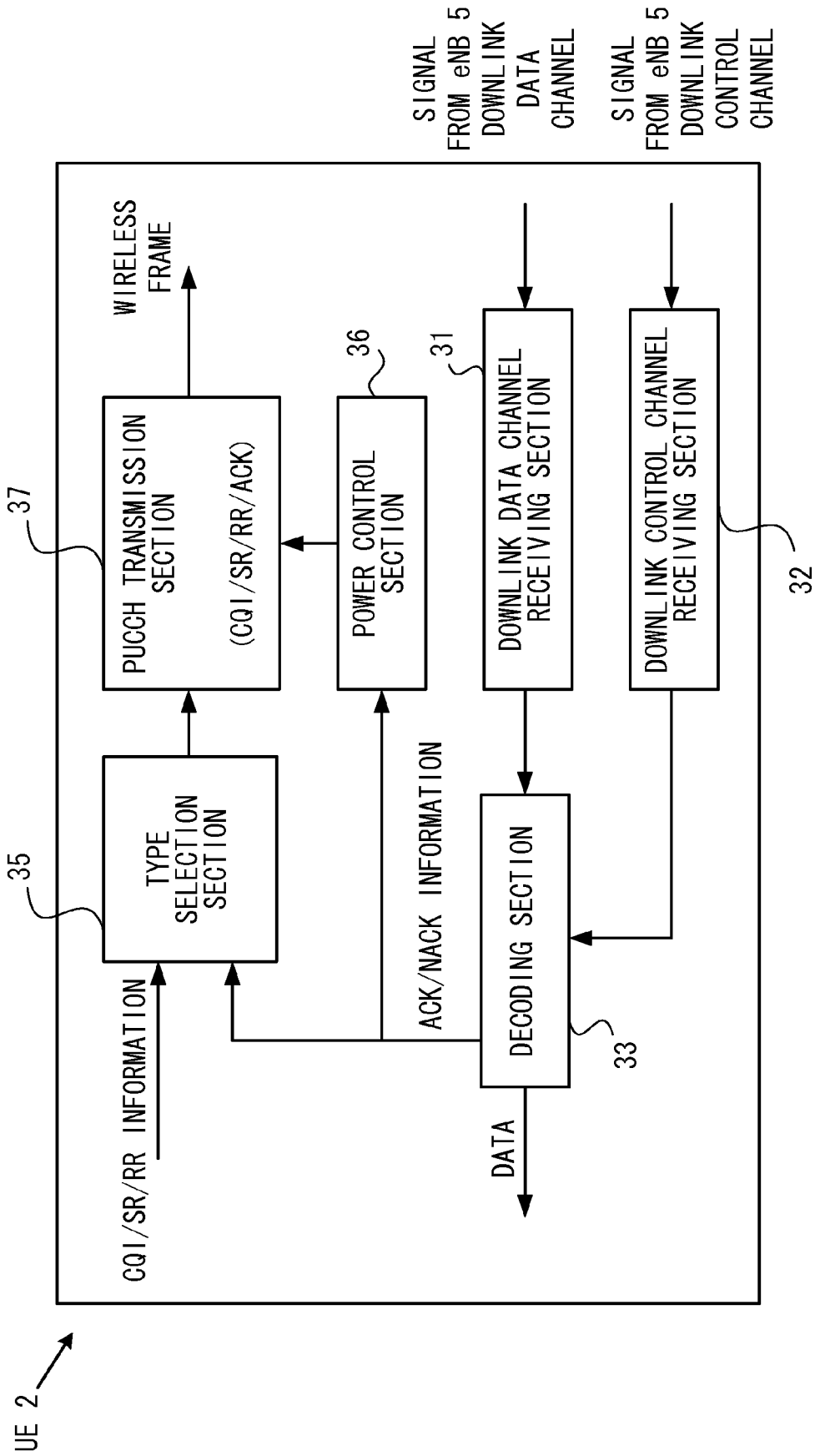
FIG. 3 is a block diagram illustrating an apparatus configuration example of a UE in the first embodiment.

FIG. 3 is a block diagram illustrating an example configuration of an apparatus of the UE 2 in the first embodiment. As illustrated in FIG. 3, the UE 2 in the first embodiment has a downlink data channel (hereinafter, referred to as a DDCH (Downlink Data Channel) receiving section 31, a downlink control channel (hereinafter, referred to as a DCCH (Downlink Control Channel) receiving section 32, a decoding section 33, a type selection section 35, a power control section 36, and a PUCCH transmission section 37. The DCCH described above is, for example, a PDCCH. Each of these processing sections is realized as a software component, a hardware component, or a combination thereof (see the section of "The others").

The DDCH receiving section 31 receives a signal transmitted from the eNB 5 by a downlink data channel, from a different processing section (not illustrated). The DDCH receiving section 31 extracts a data signal from this received signal and sends this data signal to the decoding section 33. The DCCH receiving section 32 receives a signal transmitted from the eNB 5 by a DCCH, from a different processing section (not illustrated). The DCCH receiving section 32 extracts a control data signal from this received signal and sends this control data signal to the decoding section 33.

There are two kinds of cases in which the DCCH receiving section 32 cannot receive a DCCH. One case occurs when the eNB 5 did not transmit control data by a DCCH. The other case occurs when the UE 2 cannot normally receive the DCCH due to deterioration of the radio wave environment or the like, even though the eNB 5 transmitted control data by a DCCH. If the DCCH receiving section 32 cannot extract the control data signal from the DCCH, that is, if it cannot receive the DCCH, then it cannot send the control data signal to the decoding section 33. In the first embodiment, since items that have been processed by the other processing sections illustrated here are not limited, their illustration and description thereof are omitted.

The decoding section 33 decodes a data signal and a control data signal by certain decoding methods, respectively. If the decoding section 33 succeeds in decoding and can correctly acquire control data, then it transmits data indicating ACK to the power control section 36 and the type selection section 35. On the other hand, if the decoding section 33 receives the control data signal but cannot correctly acquire the control data from the control data signal, for example, in the case of failing in decoding, then it transmits data indicating NACK to the power control section 36 and the type selection section 35.

However, the decoding section 33 does not transmit the data indicating ACK or NACK to the power control section 36 and the type selection section 35 when it does not receive a control data signal from the DCCH receiving section 32. Of course, even while the decoding section 33 does not receive a control data signal, it may transmit data indicating to the power control section 36 and the type selection section 35 that it has not received a control data signal.

The type selection section 35 acquires control data, including a CQI, an SR and an RR, to be transmitted from a different processing section (not illustrated) to the eNB 5. In the first embodiment, since the method for generating these control data is not limited, description of processings by this different processing section will be omitted. The type selection section 35 selects a format type for transmitting the control data when acquiring these control data. At this time, if data indicating ACK or data indicating NACK from the decoding section 33 has not been received, then the type selection section 35 selects any one of the format types in the format group 2 (2, 4 or 6) according to information included in the control data. On the contrary, if the data indicating ACK or the data indicating NACK from the decoding section 33 has been received, then the type selection section 35 selects any one of the format types in the format group 1 (1, 3, 5 or 7) according to the information included in the control data. The type selection section 35 sends the control data and the data indicating ACK or the data indicating NACK to the PUCCH transmission section 37 together with the selected format type.

The PUCCH transmission section 37 generates a wireless frame to be transmitted by a PUCCH, based on the data sent from the type selection section 35. Specifically, the PUCCH transmission section 37 generates the wireless frame by arranging the control data and the short CP's, illustrated in the example of FIG. 2, in a frame format according to the format type sent from the type selection section 35. At this time, if the PUCCH transmission section 37 has received the data indicating ACK or NACK, then the PUCCH transmission section 37 arranges the ACK information at a position in accordance with the format type of the format group 1 because the format group 1 is specified as the format type.

The power control section 36 performs power control of the wireless frame generated by the PUCCH transmission section 37. Specifically, if the data indicating ACK or NACK from the decoding section 33 has been received, then the power control section 36 assigns a certain transmission power to the top long block (LB1 in FIG. 2) of the wireless frame generated by the PUCCH transmission section 37. On the other hand, if the data indicating ACK or NACK from the decoding section 33 has not been received, then the power control section 36 does not assign the transmission power to the top long block (LB1 in FIG. 2) of the wireless frame generated by the PUCCH transmission section 37 (for example, it sets the block to be in a DTX state). The wireless frame generated by the PUCCH transmission section 37 and power-controlled by the power control section 36 is sent to a different processing section (not illustrated), converted to a wireless signal, and sent out from an antenna.

eNB

Figure 4:
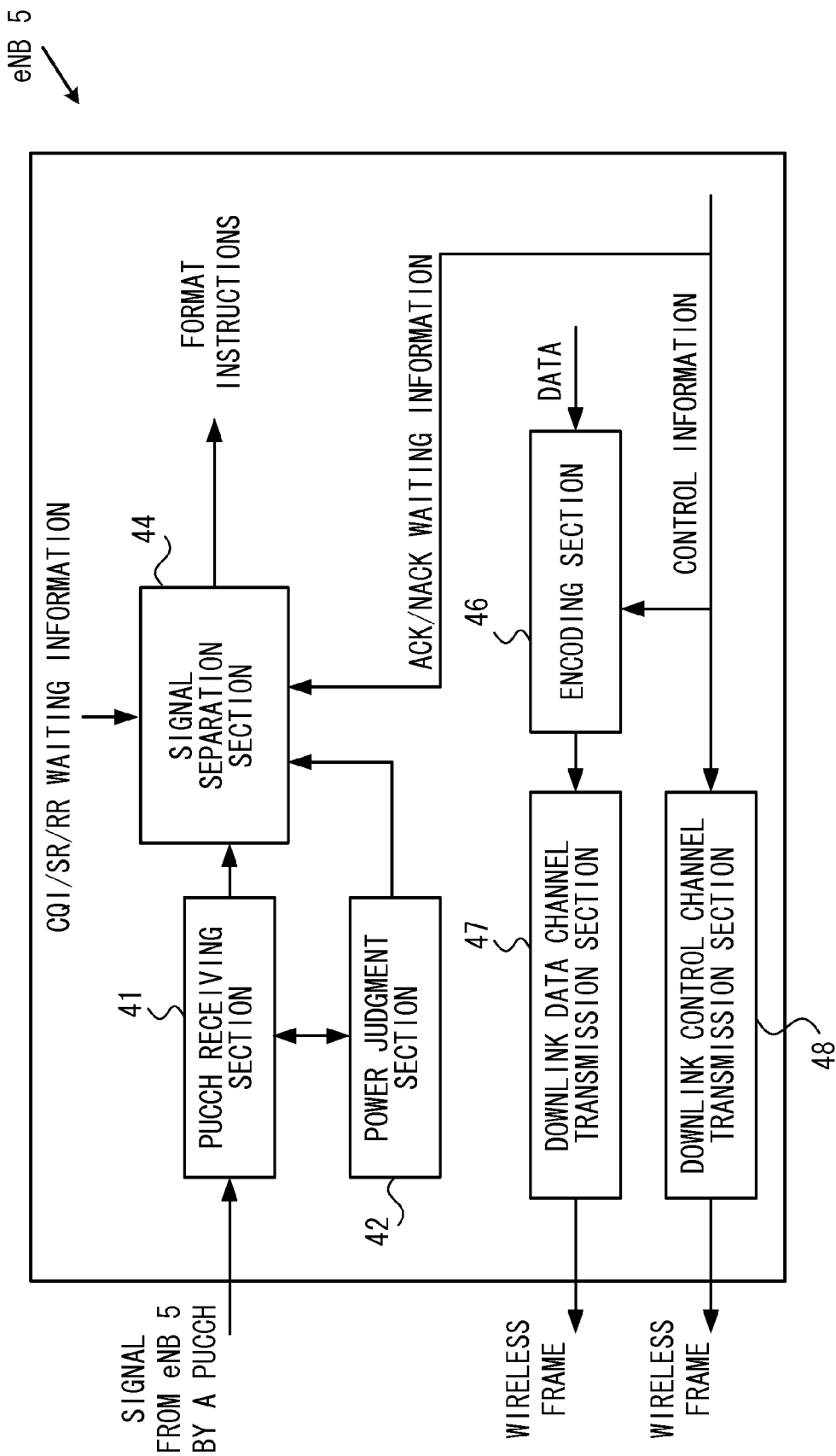
FIG. 4 is a block diagram illustrating an apparatus configuration example of an eNB in the first embodiment.

FIG. 4 is a block diagram illustrating an apparatus configuration example of the eNB 5 in the first embodiment. As illustrated in FIG. 4, the eNB 5 has a PUCCH receiving section 41, a power judgment section 42, a signal separation section 44, an encoding section 46, a downlink data channel (DDCH) transmission section 47, and a downlink control channel (DCCH) transmission section 48. Each of these processing sections of the eNB 5 is realized as a software component, a hardware component, or a combination thereof (see the section of "The others").

The encoding section 46 acquires user data and control information from a different processing section (not illustrated) and encodes the user data based on the control information. The control information includes, for example, an encoding method, such as an encoding rate, and the like.

By performing modulation and the like on the data encoded by the encoding section 46, the DDCH transmission section 47 generates a wireless frame to be transmitted by a DDCH. The wireless frame generated by the DDCH transmission section 47 is sent to a different processing section (not illustrated), converted to a wireless signal, and sent out from an antenna.

By acquiring control information from a different processing section (not illustrated) and performing modulation and the like on control data corresponding to the control information, the DCCH transmission section 48 generates a wireless frame to be transmitted by a DCCH. The wireless frame generated by the DCCH transmission section 48 is sent to a different processing section (not illustrated), converted to a wireless signal, and sent out from an antenna.

If the control data is transmitted by a DCCH as described above, it is also notified to the signal separation section 44 that the control information has occurred. Thereby, the eNB 5 transitions to a state of waiting for ACK information, which is a response to the transmitted control data, to be transmitted by the PUCCH. This waiting state will be described later in description of the signal separation section 44.

The PUCCH receiving section 41 receives a signal transmitted from the UE 2 by a PUCCH, from a different processing section (not illustrated). The PUCCH receiving section 41 extracts a wireless frame as illustrated in FIG. 2 from this receiving signal and sends this wireless frame to the signal separation section 44.

The power judgment section 42 judges the transmission power of the top long block (LB1) of the wireless frame extracted by the PUCCH receiving section 41. The transmission power of LB1 is power-controlled by the power control section 36 of the UE 2 as described above. By comparing the transmission power of LB1 and a certain threshold which is adjustably held in advance, the power judgment section 42 notifies the result of the comparison to the signal separation section 44.

The power judgment section 42 may use a value which is the same as a threshold used for received power judgment of the whole PUCCH by the PUCCH receiving section 41 or the like, as the certain threshold. By doing so, the received transmission power of the whole PUCCH is similarly judged if it is judged by the power judgment section 42 that the received transmission power of LB1 is below the threshold. Thereby, if it is judged that the received transmission power of the whole PUCCH is low, the control data then is not used. Therefore, it is possible to avoid wrong recognition of the format type due to wrong recognition of the received transmission power of LB1.

Receiving the wireless frame transmitted from the PUCCH receiving section 41 by the PUCCH, the signal separation section 44 extracts control data such as an SR, an RR, a CQI, ACK information and the like from this wireless frame, based on the format type currently selected. In this case, as described above, it is desirable that the format type of a wireless frame transmitted from the UE 2 and this format type selected by the signal separation section 44 agree with each other. This is because if they do not agree with each other, the signal separation section 44 may not be able to extract the control data from this wireless frame.

The signal separation section 44 selects a format type for signal separation based on the notification from the power judgment section 42 and a notification indicating that control information has been transmitted by a downlink. This format type selection is executed, for example, at a timing of a TTI. If the notification indicating that control information has been transmitted by a downlink has been received, then the signal separation section 44 selects the format group 1 at the timing of ACK information, which is the response to the control information, being transmitted by an uplink. The signal separation section 44 returns the setting to the format group 2 at the timing of not receiving the notification.

The signal separation section 44 selects a format type from within the selected format group in accordance with the transmission timing of the SR, the RR and the CQI. For example, in the case where the format group 1 is selected, the format type 1 is selected at the timing of any of the SR, the RR and the CQI not being transmitted, and the format type 5 is selected at the timing of the SR and the CQI being transmitted.

As described above, in order to solve the difference between the format types used by the UE 2 and the eNB 5, the signal separation section 44 changes the format type selected in this way in accordance with the notification from the power judgment section 42. ACK information is not expected when the format group 2 is selected, and the difference does not occur. Therefore, the signal separation section 44 does not change the format type.

When the format group 1 is selected, and the notification from the power judgment section 42 indicates that the transmission power of LB1 is below the threshold, then the signal separation section 44 changes the selected format type. On the other hand, if the notification from the power judgment section 42 indicates that the transmission power of LB1 is equal to or above the threshold, then the selected format type is maintained because the DCCH has been normally received by the UE 2.

When the format type is changed, any one of the format types 1, 3, 5 and 7 has been selected. Therefore, the signal separation section 44 changes the selected type to a type in which ACK information is not included. Specifically, when the format type 7 is selected, the signal separation section 44 changes the format type 7 to the format type 6 which includes control data (an RR and a CQI) obtained by deleting ACK information from the control data (the RR, the CQI and the ACK information) included in the format type 7. Similarly, when the format type 5 is selected, the signal separation section 44 changes the format type 5 to the format type 4. When the format type 3 is selected, the signal separation section 44 changes the format type 3 to the format type 2. When the format type 1 is selected, the signal separation section 44 does not have to change the format type because the format type 1 includes only ACK information.

When the format type is changed as described above is the case where, though control data is transmitted from the eNB 5 by a DCCH, the UE 2 cannot normally receive the DCCH. Even in this case, the signal separation section 44 of the eNB 5 can acquire control data other than ACK information.

Operation Example

Figure 5:
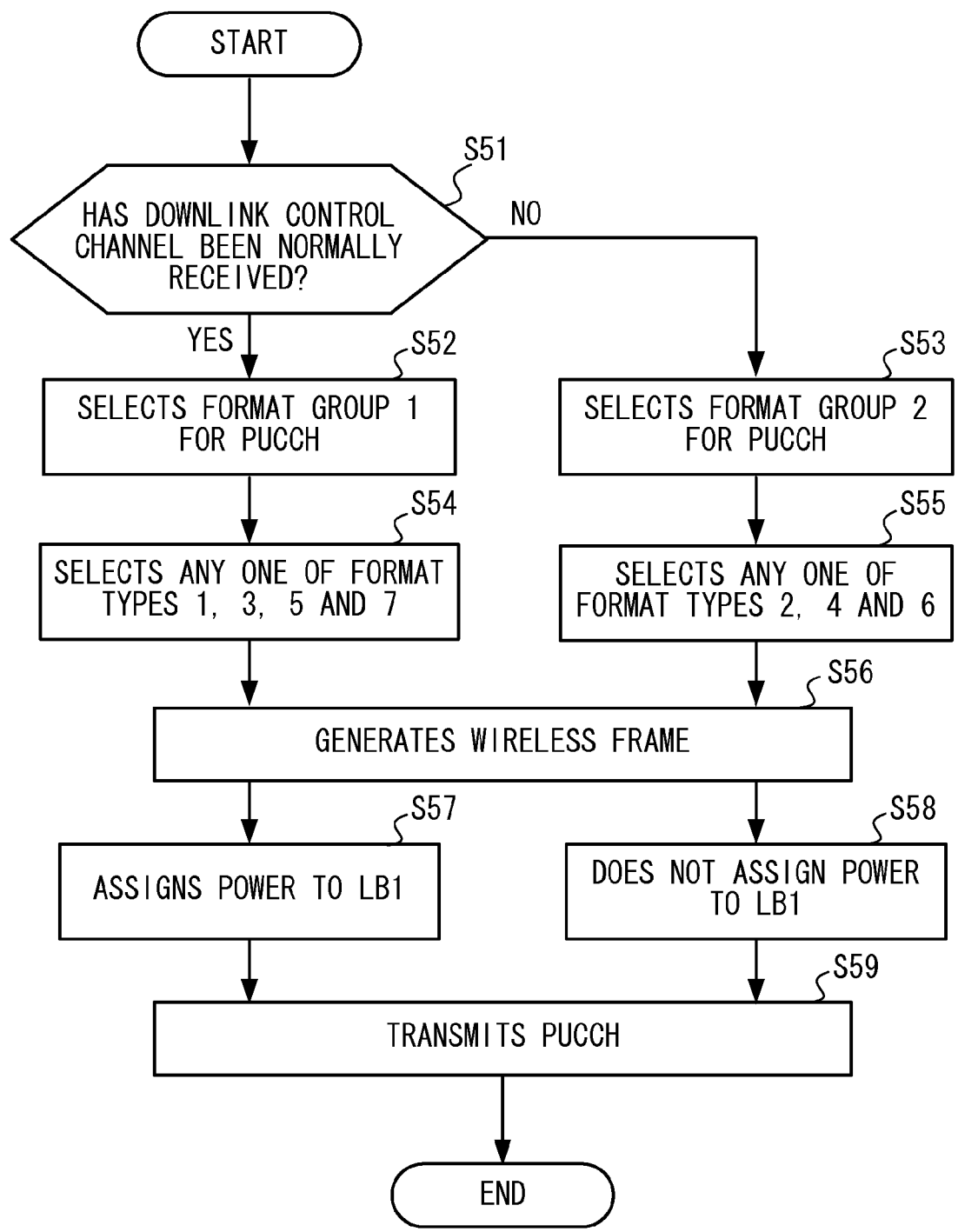
FIG. 5 is a flowchart illustrating an operation example of the UE in the first embodiment.
Figure 6:
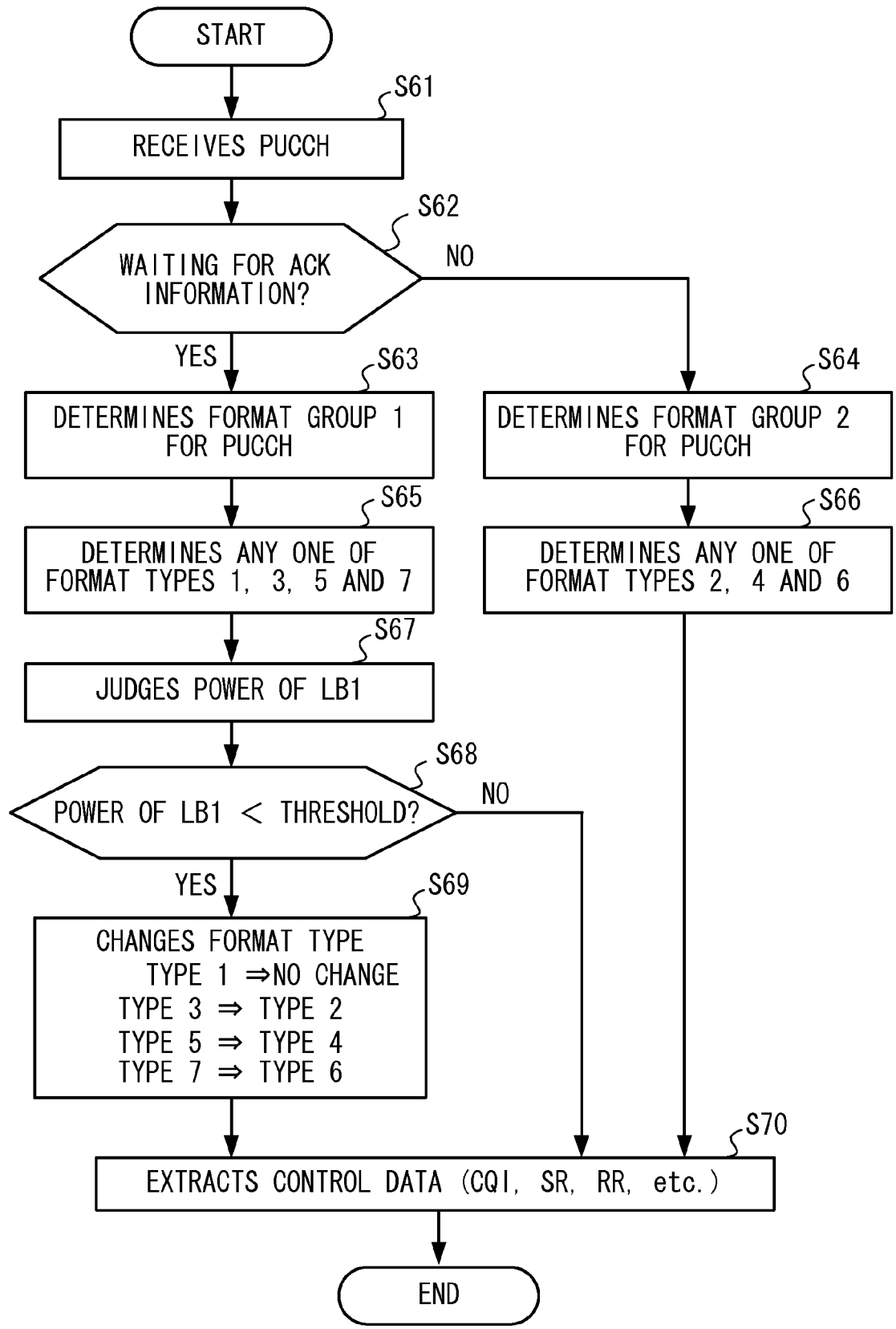
FIG. 6 is a flowchart illustrating an operation example of the eNB in the first embodiment.

An example of the operation of the mobile communication system 1 in the first embodiment will be described below with the use of FIGS. 5 and 6. FIG. 5 is a flowchart illustrating an operation example of the UE 2 in the first embodiment. FIG. 6 is a flowchart illustrating an operation example of the eNB 5 in the first embodiment.

If a control data signal is able to have been extracted from a DCCH, that is, if having normally received a DCCH (S51: YES), then the UE 2 in the first embodiment acquires downlink control data from this control data signal (the decoding section 33). If a DCCH is not able to have been normally received due to deterioration of the radio wave environment or the like (S51: NO), then the UE 2 may not be able to acquire downlink control data from the DCCH (the decoding section 33).

In the UE 2, the state of receiving the control data is monitored by the decoding section 33, and any one of the seven format types illustrated in FIG. 2 is selected by the type selection section 35 as the format to be applied to a frame of a PUCCH, depending on whether the control data has been received or not. Specifically, if the UE 2 could normally receive a DCCH (S51: YES), then the type selection section 35 selects the format group 1 (S52), and further selects any one type from within the format group 1 (the format types 1, 3, 5 and 7) (S54). On the other hand, if the UE 2 could not normally receive a DCCH (S51: NO), then the type selection section 35 selects the format group 2 (S53), and further selects any one type from within the format group 2 (the format types 2, 4 and 6) (S55). The type selection at S54 and S55 is executed, for example, for each TTI based on the existence of control data (an SR, an RR and a CQI) to be transmitted, the transmission timing of the control data, and the like.

The PUCCH transmission section 37 generates a wireless frame in which the control data is arranged with this selected format type (S56). According to the control data receiving state identified by the decoding section 33, the power control section 36 controls the transmission power of the top long block (LB1) of the wireless frame. If the UE 2 has normally received a DCCH, then the power control section 36 assigns a certain transmission power to LB1 (S57). If the UE 2 has not normally received a DCCH, then the power control section 36 does not assign the transmission power to LB1. The UE 2 transmits the power-controlled wireless frame to the eNB 5 by the PUCCH (S59).

Under such control, if a DCCH is able to have been received, then the UE 2 transmits a wireless frame which has any one frame format among the format types 1, 3, 5 and 7 and in which a certain transmission power is assigned to the symbol of the top long block, by a PUCCH. On the other hand, if a DCCH is not able to have been received, then the UE 2 transmits a wireless frame which has any one frame format among the format types 2, 4 and 6 and in which the transmission power is not assigned to the symbol of the top long block, by a PUCCH.

When the UE 2 cannot receive a DCCH, which includes the cases where the eNB 5 intentionally did not transmit control data and also when the eNB 5 transmitted control data but the UE 2 could not normally receive the DCCH. Conventionally, in the latter case, PUCCH format type difference has occurred between the eNB 5 and the UE 2.

In order to solve such difference, the UE 2 in the first embodiment informs the eNB 5 of a DCCH receiving state by controlling the transmission power of the top long block (LB1) of a wireless frame.

In FIG. 6, the eNB 5 receives a PUCCH frame sent out as described above (S61). At this time, the signal separation section 44 of the eNB 5 detects whether or not control data has been transmitted by a DCCH. If it has been transmitted, the signal separation section 44 waits for ACK information. If the signal separation section 44 expects ACK information about the received wireless frame (S62: YES), then it determines the format group 1 as the format type of the PUCCH wireless frame (S63), and further determines any one type from within the format group 1 (the format types 1, 3, 5 and 7) (S65). On the other hand, if the signal separation section 44 does not expect ACK information about the received wireless frame (S62: NO), then it determines the format group 2 as the format type of the PUCCH wireless frame (S64), and further determines any one type from within the format group 2 (the format types 2, 4 and 6) (S66).

In the eNB 5 in the first embodiment, the power judgment section 42 judges the transmission power of the top long block (LB1) of the received wireless frame (S67). Upon receiving a result of this judgment, the signal separation section 44 changes the format type already determined (S69) if the format type already determined is included in the format group 1, and the transmission power of LB1 is below a certain threshold (S68: YES).

The power judgment section 42 of the eNB 5 may be adapted to process the power judgment only when the format group 1, which requires change of the format type, is selected as a waiting state as illustrated in FIG. 6, or may be adapted to always perform the power judgment. The former configuration brings about power consumption reduction at the eNB 5.

The signal separation section 44 of the eNB 5 extracts control data (for example, an SR, an RR and a CQI) from the wireless frame using the format type determined as described above (S70).

As described above, the eNB 5 in the first embodiment can judge a DCCH receiving state at the UE 2 by judging the transmission power of LB1 of a PUCCH frame. That is, the eNB 5 can judge that the UE 2 has normally received a DCCH if the transmission power of LB1 is a certain threshold or above and judge that the UE 2 has not normally received a DCCH or the UE 2 itself has not transmitted a DCCH if the transmission power of LB1 is below the certain threshold.

Based on this judgment, when the eNB 5 is going to apply the format group 1 to a received PUCCH frame to wait for ACK information and judges that the UE 2 has not normally received a DCCH, the eNB 5 changes the format type already determined to the format group 2. Thereby, it is possible to solve a difference caused when the eNB 5 has transmitted DCCH and is in the state of waiting for ACK information (in the state of expecting the format group 1) and the UE 2 could not normally receive the DCCH and has transmitted a PUCCH frame of the format type 2.

The eNB 5 cannot acquire the data (symbol) arranged in the LB1 if the transmission power is not assigned to LB1 of a PUCCH frame. However, the UE 2 usually encodes control data, such as an SR, an RR and a CQI, at a certain encoding rate, and divides and arranges them in multiple data blocks. Therefore, though the characteristics deteriorate, acquisition of the control data by the eNB 5 is not necessarily completely impossible even if loss of data arranged in LB1 occurs. Therefore, the method in the first embodiment is effective in comparison with the case where PUCCH format type difference occurs between the UE 2 and the eNB 5, and acquisition of the control data by the eNB 5 is not possible.

According to the mobile communication system 1 in the first embodiment, control data in a PUCCH can be acquired by the eNB 5.

Operation and Advantages of the Embodiment

In the first embodiment, the UE 2 switches the state of assignment of the transmission power to a certain time block in a frame transmitted by an uplink control channel, according to a downlink control channel (DCCH) receiving state. Specifically, if the UE 2 has received a downlink control channel, the transmission power is assigned to the time block, and if the UE 2 has not received a downlink control channel, then the transmission power is not assigned to the time block.

On the other hand, the eNB 5 in the first embodiment judges the state of receiving of a downlink control channel transmitted by the eNB 5 at the UE 2, based on the received transmission power of at least one time block in a frame received by an uplink control channel. Thereby, only by judging the received transmission power, the eNB 5 can judge whether or not at least information about confirmation of receiving of the downlink control channel is included in the frame transmitted by the received uplink control channel. As a result, the eNB 5 can determine the format of the received frame from among multiple formats for identifying the arrangement of control data in the frame transmitted by the uplink control channel.

Thus, the first embodiment provides advantages where there may be a recognition difference between the eNB 5 and the UE 2 caused in the case where the UE 2 cannot normally receive a downlink control channel transmitted from the eNB. Therefore, even in such a case, the eNB 5 can certainly acquire control data from an uplink control channel.

In the first embodiment, the multiple formats include formats which include information about confirmation of receiving a downlink control channel at the UE 2 and formats which do not include the receiving confirmation information. If the received transmission power is below a certain threshold, the eNB 5 changes the waiting format. The eNB 5 processes the judgment of the received transmission power if the format which includes the receiving confirmation information is determined as the waiting format, and does not process the judgment of the received transmission power if the format which does not include the receiving confirmation information is determined as the waiting format.

When the eNB 5 sets the format, which includes the downlink control channel receiving confirmation information as the waiting format, the recognition difference between the eNB 5 and the UE 2 described above occurs. Therefore, when the waiting format is the format which includes the receiving confirmation information, then the eNB 5 processes the received power judgment of a certain time block in a frame transmitted by an uplink control channel. Thus, the eNB 5 can cause power judgment processing to operate only when necessary, and therefore, it is possible to reduce power consumption accompanying the power judgment processing.

If the UE 2 does not assign the transmission power to a certain time block targeted by power control, then the eNB 5 may not be able to acquire the data symbol arranged in this time block. In consideration of this point, the multiple formats can be configured so that only the downlink control channel receiving confirmation information is assigned to a time block targeted by the received power judgment in a frame.

It is possible to avoid loss of control data other than the receiving confirmation information which is transmitted by a downlink control channel by arranging the other control data in a time block other than the time block in which the receiving confirmation information is arranged.

Furthermore, the certain threshold used for the power judgment can be the same as the threshold used for received power judgment of an uplink control channel. By doing so, it is possible to avoid that only the power judgment of a certain time block is incorrect.

Variation Embodiments

In the mobile communication system 1 in the first embodiment, the eNB 5 judges a DCCH receiving state at the UE 2 according to the transmission power of the top long block (LB1) of a PUCCH frame. However, it is also possible to perform the judgment according to the transmission power of a different block or multiple blocks.

Furthermore, though the example using short CP's as illustrated in FIG. 2 is illustrated as the frame structure of a PUCCH in the first embodiment, long CP's may be used.

Furthermore, though the example of controlling the transmission power of LB1 of a frame having each format illustrated in FIG. 2 is illustrated in the first embodiment, it is also possible to newly adopt a frame structure in which ACK information is arranged in LB1 in all the formats as illustrated in FIG. 7. FIG. 7 is a diagram illustrating a PUCCH transmission type in the variation embodiment. If the UE 2 does not receive a DCCH, the UE 2 does not assign the transmission power to LB1, and therefore, the eNB 5 may not be able to acquire the data (symbol) arranged in this LB1.

In the formats in FIG. 7, loss of data in LB1 is taken into consideration in advance, and ACK information is arranged in LB1 in all the types. In this variation embodiment, the information arranged in LB1 in the formats in FIG. 2 (SCHEDULING REQUEST BIT and RELEASE REQUEST BIT) is arranged in or after LB3 instead of arranging ACK information in LB1, in the format types 2, 4 and 6 which do not have ACK information.

By doing so, it is possible to avoid loss of the other control data (CQI and the like). In this case, the encoding rate of the other control data can be lowered so that the other control data can be divided and arranged in other data blocks. The present embodiment does not limit the arrangement of control data other than ACK information.

[The Others]
Hardware Component and Software Component

A hardware component is a hardware circuit which includes, for example, a field programmable gate array (FPGA), application specific integrated circuit (ASIC), gate array, combination of logical gates, signal processing circuit, analog circuit and the like.

A Software component is a part (fragment) for realizing the processing described above as software, and is not a concept which limits the language, the development environment and the like for realizing the software. The software component includes, for example, a task, process, thread, driver, firmware, database, table, function, procedure, subroutine, certain part of program code, data structure, array, variable, parameter and the like. Such a software component is realized on one or multiple memories (one or multiple processors (for example, a CPU (Central Processing Unit), a DSP (Digital Signal Processor) and the like).

Each of the embodiments described above does not limit the method of realizing each of the processing sections described above. Each of the processing sections described above may be configured by a method which can be realized by an ordinary engineer in this technical field, as the hardware component or software component described above or a combination thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A base station apparatus comprising:
a receiving section which receives a frame transmitted by an uplink control channel from a communication apparatus;
a power judgment section which compares a received transmission power of at least one time block in the frame received by the receiving section and a certain threshold, and judges the state of receiving a downlink control channel from the base station apparatus at the communication apparatus, based on a result of the comparison; and
a determination section which determines a format of the frame received by the receiving section from among multiple uplink control channel frame formats, based on a result of the judgment by the power judgment section.

2. The base station apparatus according to claim 1, wherein the multiple uplink control channel frame formats include first formats which include information about confirmation of receiving the downlink control channel at the communication apparatus and second formats which do not include the information about confirmation of receiving the downlink control channel; and
if the first format is determined as a waiting format when the downlink control channel is transmitted, and if the received transmission power is below the certain threshold, as the result of the judgment by the power judgment section, then the determination section changes the selected first format to the second format.

3. The base station apparatus according to claim 2, wherein
the power judgment section processes the received power judgment if the first format has been determined as the waiting format by the determination section, and does not process the received power judgment if the second format has been determined as the waiting format by the determination section.

4. The base station apparatus according to claim 2, wherein, in the multiple formats, only the downlink control channel receiving confirmation information is assigned to a time block targeted by the received power judgment by the power judgment section in the frame.

5. The base station apparatus according to claim 1, wherein the power judgment section sets the certain threshold to be the same threshold as is used for the received power judgment for the uplink control channel.

* * * * *